US012163537B1

(12) United States Patent
Ramprashad et al.

(10) Patent No.: US 12,163,537 B1
(45) Date of Patent: Dec. 10, 2024

(54) THREE WAY TRANSFER VALVE FOR PARALLEL ELECTROHYDRAULIC SERVO VALVE CONTROL OF ACTUATOR

(71) Applicant: Hamilton Sundstrand Corporation, Charlotte, NC (US)

(72) Inventors: Sachin Ramprashad, West Hartford, CT (US); August M. Coretto, Windsor, CT (US); Frank Perrelli, East Haven, CT (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/382,281

(22) Filed: Oct. 20, 2023

(51) Int. Cl.
*F15B 13/044* (2006.01)
*F15B 13/04* (2006.01)
*F15B 20/00* (2006.01)

(52) U.S. Cl.
CPC ........ *F15B 13/044* (2013.01); *F15B 13/0402* (2013.01); *F15B 20/008* (2013.01); *F15B 2013/0412* (2013.01)

(58) Field of Classification Search
CPC .......... F15B 13/0402; F15B 2013/0412; F15B 13/043; F15B 13/10; F15B 20/00; F15B 20/008
USPC .............................. 60/403, 405; 91/444–448
See application file for complete search history.

(56) References Cited

U.S. PATENT DOCUMENTS

| | | | | |
|---|---|---|---|---|
| 5,322,003 | A | 6/1994 | Winyard et al. | |
| 5,797,294 | A | 8/1998 | Bohner et al. | |
| 6,637,199 | B2 | 10/2003 | Spickard | |
| 6,823,669 | B2 | 11/2004 | Kogan et al. | |
| 7,200,993 | B2 | 4/2007 | Khalil et al. | |
| 8,020,379 | B2 | 9/2011 | Kakino et al. | |
| 8,096,321 | B2 | 1/2012 | Goll | |
| 9,657,756 | B2 | 5/2017 | Bostiga et al. | |
| 10,577,080 | B2 * | 3/2020 | Maver | F15B 20/008 |
| 10,711,903 | B2 * | 7/2020 | Coretto | F16K 3/316 |
| 11,572,901 | B2 | 2/2023 | Workman et al. | |
| 11,852,172 | B2 * | 12/2023 | O'Rorke | F01D 17/10 |
| 12,024,306 | B2 * | 7/2024 | Susca | G05D 16/2022 |
| 2019/0383310 | A1 | 12/2019 | Ortner et al. | |
| 2023/0265937 | A1 * | 8/2023 | O'Rorke | F16K 31/0606 415/148 |
| 2023/0339604 | A1 * | 10/2023 | Susca | B64C 13/504 |
| 2024/0175399 | A1 * | 5/2024 | Hahn | F02C 9/46 |

FOREIGN PATENT DOCUMENTS

EP 4215762 A1 7/2023

* cited by examiner

*Primary Examiner* — Michael Leslie
(74) *Attorney, Agent, or Firm* — Kinney & Lange, P. A.

(57) ABSTRACT

A method includes using two parallel electrohydraulic servo valves EHSVs with a single transfer valve to move an actuator during a normal operation mode. The method includes upon failure of one of the EHSVs, using the single transfer valve to disconnect a non-operational one of the EHSVs and continuing to move the actuator with a functional one of the EHSVs in a backup mode.

20 Claims, 3 Drawing Sheets

THREE WAY TRANSFER VALVE FOR PARALLEL ELECTROHYDRAULIC SERVO VALVE CONTROL OF ACTUATOR

BACKGROUND

1. Field

The present disclosure relates to hydraulic controls, and more particularly to hydraulic control of end effectors such as those used with actuators aboard aircraft.

2. Description of Related Art

Traditionally, an effector actuator required two full sized electrohydraulic servo valves (EHSVs) each sized for full capability on its own. One EHSV was for normal operation, and the other was for backup. The switch between the normal EHSV and the backup EHSV was via a transfer valve and a transfer EHSV/solenoid. Normal operation occurred with only the one active EHSV. In the event of failure of that EHSV, control could be transferred to the backup EHSV.

The conventional techniques have been considered satisfactory for their intended purpose. However, there is an ever present need for improved systems and methods for backing up EHSVs and controlling actuators. This disclosure provides a solution for this need.

SUMMARY

A system includes a first electrohydraulic servo valve (EHSV) configured to be in fluid communication with a pressure supply and with a pressure return. The first EHSV includes a first actuator extend line and a first actuator retract line and is operatively connected to pressurize one of the first actuator extend line or the first actuator retract line. A second EHSV is configured to be in fluid communication with the pressure supply and with the pressure return. The second EHSV includes a second actuator extend line and a second actuator retract line and is operatively connected to pressurize one of the second actuator extend line or the second actuator retract line.

A transfer valve is connected in fluid communication with the first EHSV via the first extend actuator line and via the first retract actuator line. The transfer valve is connected in fluid communication with the second EHSV via the second extend actuator line and via the second retract actuator line. An actuator has an extend chamber in fluid communication with both of the first and second extend actuator lines through the transfer valve. The actuator has a retract chamber in fluid communication with both of the first and second retract actuator lines through the transfer valve for extending an end effector when the first and second EHSVs pressurize the extend chamber, and for retracting the end effector when the first and second EHSVs pressurize the retract chamber.

The transfer valve has the three following states. A first state connects both of the first EHSV and the second EHSV in fluid communication with the extend chamber and with the retract chamber for normal operation of the actuator with combined power from both the first EHSV and the second EHSV. A second state disconnects the first EHSV from the actuator but connects the second EHSV in fluid communication with the actuator for a first backup mode in event of the first EHSV being non-operational. A third state disconnects the second EHSV from the actuator but connects the first EHSV in fluid communication with the actuator for a second backup mode in event of the second EHSV being non-operational.

The transfer valve can include a valve extend chamber in fluid communication with both of the first and second extend actuator lines, and in fluid communication with a shared extend line that connects the valve extend chamber in fluid communication with the extend chamber of the actuator. A valve retract chamber can be in fluid communication with both of the first and second retract actuator lines, and in fluid communication with a shared retract line that connects the valve retract chamber in fluid communication with the retract chamber of the actuator.

The transfer valve can include a spool separating the valve extend chamber and the valve retract chamber in fluid isolation from one another within a housing of the transfer valve. The spool can include one or more lands configured to block the first actuator extend line and the first actuator retract line in the second state from fluid communication with the actuator, to block the second actuator extend line and the second actuator retract line in the third state from fluid communication with the actuator, and to unblock all of the first actuator extend line, the first actuator retract line, the second actuator extend line, and the second actuator retract line for fluid communication with the actuator in the first state.

The housing of the transfer valve can include a first high pressure centering port, a second high pressure centering port, and a low pressure centering port. The spool can include a centering land configured to block the low pressure centering port in the first state, to block the second high pressure centering port in the second state, and to block the first high pressure centering port in the third state.

A first solenoid valve can be operatively connected to actuate the spool of the transfer valve. The first solenoid valve can be in fluid communication with a first actuation chamber of the transfer valve, and with the pressure supply and the pressure return for selectively pressurizing/depressurizing the first actuation chamber of the transfer valve to bias the spool to the third state. A second solenoid valve can be operatively connected to actuate the spool of the transfer valve. The second solenoid valve can be in fluid communication with a second actuation chamber of the transfer valve, and with the pressure supply and the pressure return for selectively pressurizing/depressurizing the second actuation chamber of the transfer valve to bias the spool to the second state.

A controller can be operatively connected to control the first and second EHSVs to control the actuator in the normal operation mode. The controller can be operatively connected to control the first solenoid valve to disconnect the first EHSV from the actuator with the first EHSV in the non-operational mode. The controller can be operatively connected to control the second solenoid valve to disconnect the second EHSV from the actuator with the second EHSV in the non-operational mode. The controller can be configured to disable first EHSV and continue operating the actuator at reduced power using only the second EHSV. The controller can be configured to disconnect the first EHSV from the actuator during failure of first EHSV. The controller can be configured to disable the second EHSV and continue operating actuator at reduced power using only the first EHSV. The controller can be configured to disconnect the second EHSV from the actuator during failure of second EHSV.

A method includes using two parallel electrohydraulic servo valves EHSVs with a single transfer valve to move an actuator during a normal operation mode. The method includes upon failure of one of the EHSVs, using the single transfer valve to disconnect a non-operational one of the EHSVs and continuing to move the actuator with a functional one of the EHSVs in a backup mode. Using the transfer valve can include controlling the transfer valve with a solenoid valve. The method can include disconnecting a failed one of the EHSVs from the actuator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
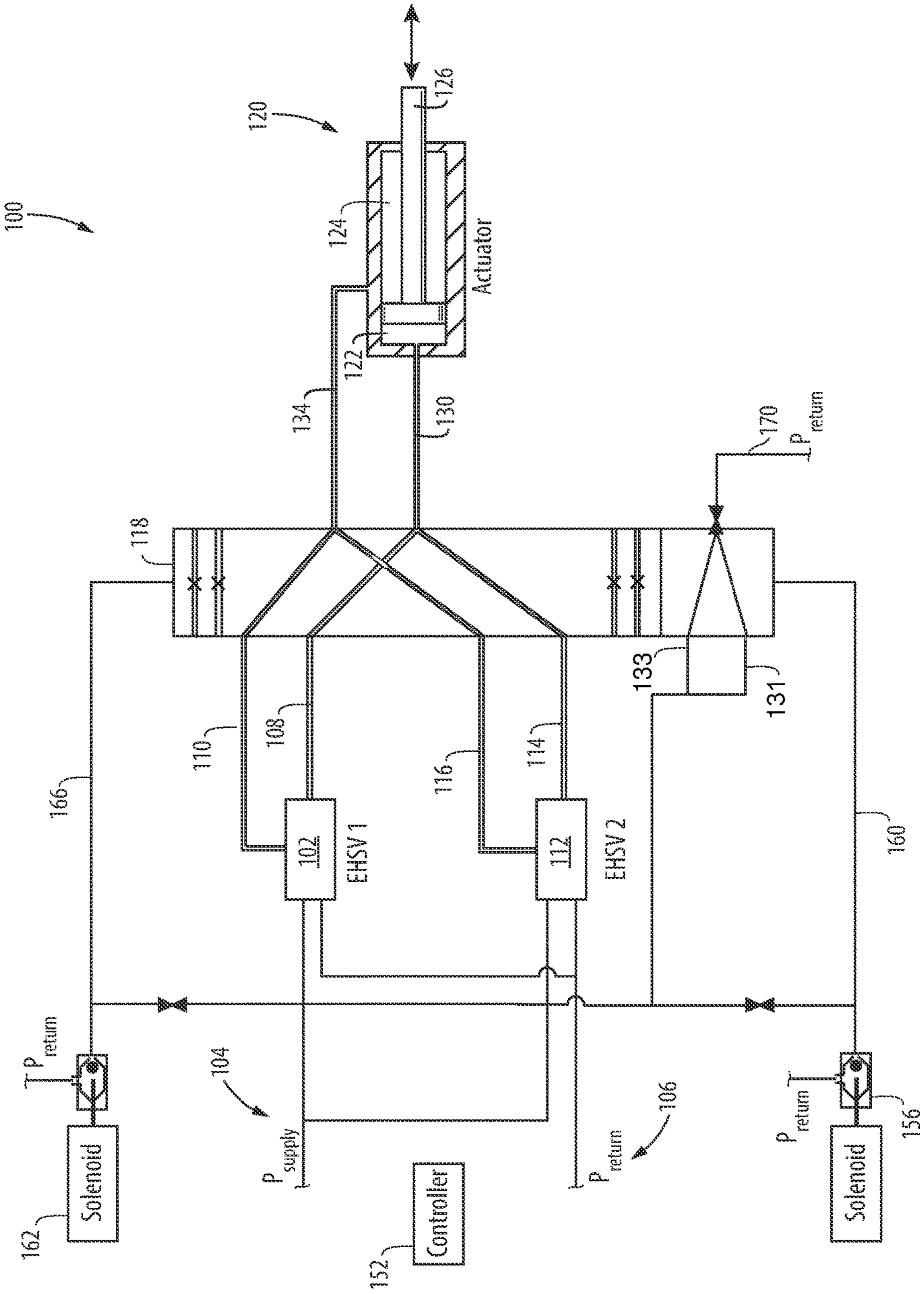
FIG. 1 is a schematic view of an embodiment of a system constructed in accordance with the present disclosure, showing the parallel electrohydraulic servo valves (EHSVs), the transfer valve, and the solenoid valves.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to reduce actuator weight, envelope, and leakage for a component traditionally requiring dual electrohydraulic servo valves (EHSVs), a transfer valve, and a transfer EHSV.

An effector actuator can be controlled simultaneously by two smaller EHSV's operating hydraulically and electrically in parallel. In normal operation, both EHSVs drive flow to the actuator extend and retract cavities of a 3-way transfer valve that is hydraulically centered. In the event of an EHSV failure the transfer valve can be spooled by means of solenoids to allow the other still-functioning EHSV to control the actuator at a limited rate.

The system 100 includes a first electrohydraulic servo valve (EHSV) 102 connected in fluid communication with a pressure supply 104 and with a pressure return 106. The first EHSV 102 includes a first actuator extend line 108 and a first actuator retract line 110 and is operatively connected to pressurize one of the first actuator extend line 108 or the first actuator retract line 110 at a time. A second EHSV 112 is connected in fluid communication with the pressure supply 104 and with the pressure return 106. The second EHSV 112 includes a second actuator extend line 114 and a second actuator retract line 116 and is operatively connected to pressurize one of the second actuator extend line 114 or the second actuator retract line 116 at a time.

A transfer valve 118 is connected in fluid communication with the first EHSV 102 via the first extend actuator line 108 and via the first retract actuator line 110. The transfer valve 118 is connected in fluid communication with the second EHSV 112 via the second extend actuator line 114 and via the second retract actuator line 116. An actuator 120 has an extend chamber 122 in fluid communication with both of the first and second extend actuator lines 108, 114 through the transfer valve 118. The actuator 120 has a retract chamber 124 in fluid communication with both of the first and second retract actuator lines 110, 116 through the transfer valve 118. This allows for extending an end effector 126 when the first and second EHSVs 102, 112 pressurize the extend chamber 122, and for retracting the end effector 126 when the first and second EHSVs 102, 112 pressurize the retract chamber 124.

The transfer valve 118 has the three following states. A first state connects both of the EHSVs 102, 112 in fluid communication with the chambers 122, 124 for normal operation of the actuator with combined capability from both the first EHSV 102 and the second EHSV 112. A second state disconnects the first EHSV 102 from the actuator 120 but keeps the second EHSV 112 connected in fluid communication with the actuator 120 for a first backup mode in event of the first EHSV 102 being non-operational. A third state disconnects the second EHSV 112 from the actuator 120 but keeps the first EHSV 102 connected in fluid communication with the actuator 120 for a second backup mode in event of the second EHSV 112 being non-operational.

Figure 2:
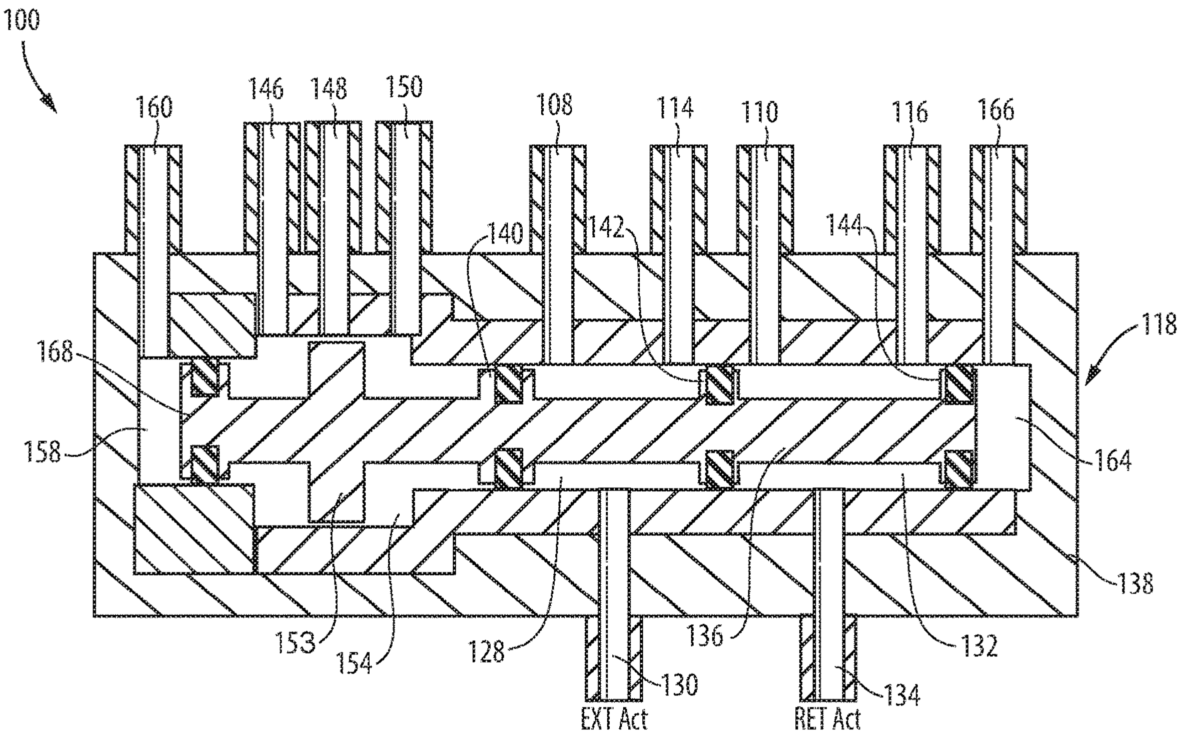
FIGS. 2-4 are a schematic views of a portion of the system of FIG. 1, showing the internals of the transfer valve in the centered position, the first backup position, and the third backup position, respectively.

With reference now to FIG. 2, the transfer valve 118 includes a valve extend chamber 128 in fluid communication with both of the first and second extend actuator lines 108, 114, and in fluid communication with a shared extend line 130 that connects the valve extend chamber 128 in fluid communication with the extend chamber 122 of the actuator 120 (labeled in FIG. 1). A valve retract chamber 132 is in fluid communication with both of the first and second retract actuator lines 110, 116, and in fluid communication with a shared retract line 134 that connects the valve retract chamber 132 in fluid communication with the retract chamber 124 of the actuator 120 (labeled in FIG. 1).

FIG. 2 shows the valve in the first state described above, for operation using both EHSVs 102, 112 (labeled in FIG. 1). The transfer valve includes a spool 136 with land 142 separating the valve extend chamber 128 and the valve retract chamber 132 in fluid isolation from one another within a housing 138 of the transfer valve 118. The spool 136 includes lands 140, 142, 144. In the centered position, shown in FIG. 2, the second land 142 separates the chambers 128, 132 from one another, and none of the lands 140, 142, 144 block any lines. The lands 140, 142, 144 may or may not include elastomeric seal elements for improved sealing performance. In the drawings, the pink rectangles represent potential seal locations. This centered position is for normal operation, where both EHSVs 102, 112 (labeled in FIG. 1) drive flow to the actuation chambers 122, 124 when the 3-way transfer valve 136 is hydraulically centered within the housing 138.

Figure 3:
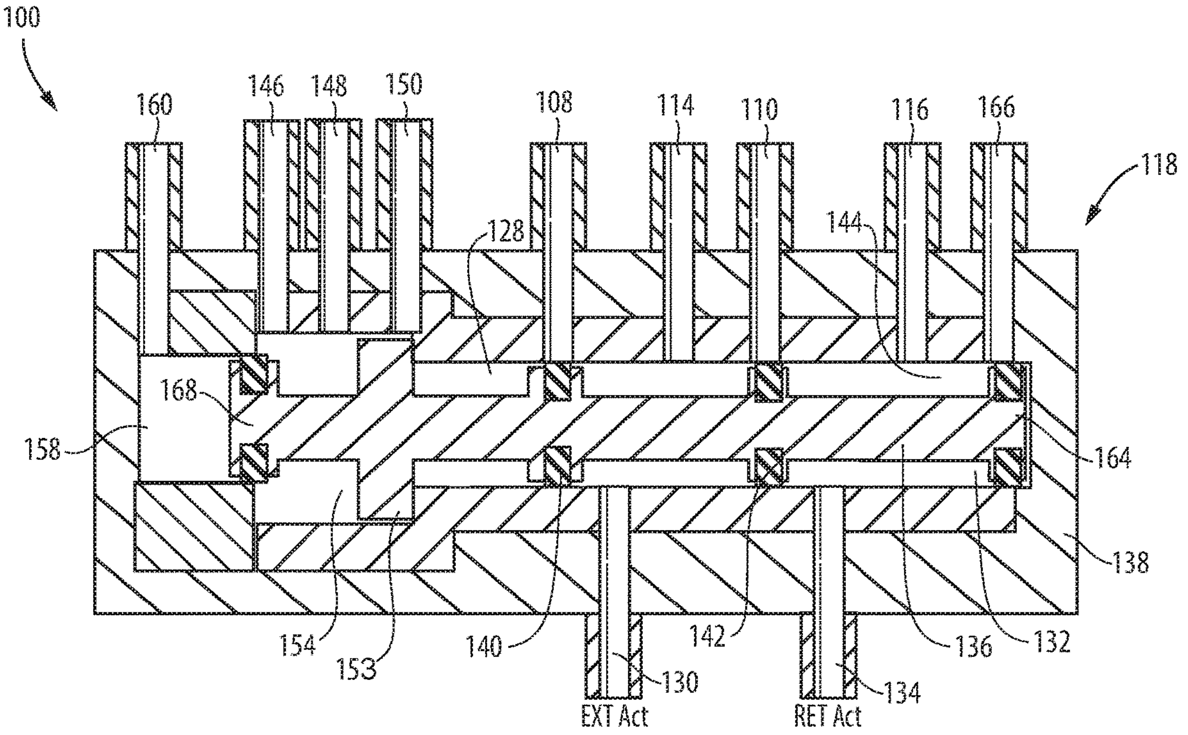
Figure 4:
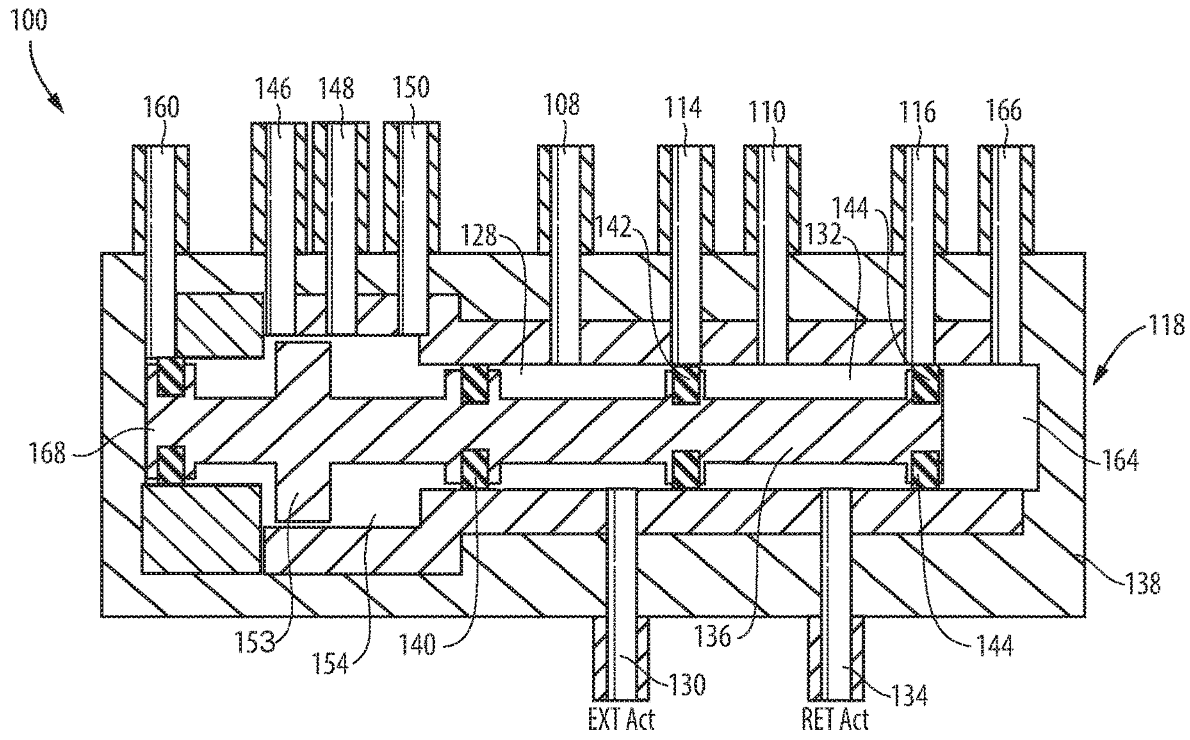

With reference now to FIG. 3, with the valve in the second state for disconnecting the first EHSV 102 from the actuator 120 (labeled in FIG. 1), the land first land 140 blocks the first actuator extend line 108. In this position of the spool, the second land 142 blocks the first actuator retract line 110. As shown in FIG. 4, with the valve in the third state for disconnecting the second EHSV 112 from the actuator 120 (labeled in FIG. 1), the second land 142 blocks the second actuator extend line 114. In this position of the spool, the third land 144 blocks the second actuator retract line 116.

With continued reference to FIGS. 2-4, the housing 138 includes a first high pressure centering port 146, a second high pressure centering port 150, and a low pressure centering port 148. The spool 136 includes a larger diameter centering land 153 configured to block the low pressure centering port 148 in the first state (FIG. 2), to block the second high pressure centering port 150 in the second state (FIG. 3), and to block the first high pressure centering port 146 in the third state (FIG. 4). The centering land 153 covers the ports 146, 148, 150 depending on the position the spool 136. The spool 136 is hydraulically centered in the normal mode as follows. The first high pressure centering port 146 can be configured to be in fluid communication with a first centering control pressure line 131 (e.g., as shown in FIG. 1), and the second high pressure centering port 150 can be configured to be in fluid communication with a second centering pressure control line 133 (e.g., as shown in FIG. 1). When the command pressures in cavities 158 and 164 are equal, the centering load will overcome the other loads applied and the spool will transition to the normal state. When the valve is commanded to either backup mode by changing either pressure 158 or 164, the command load will overcome the centering mode and the spool will transition to the backup state. It is in this way that the valve will have 3 discrete positions while only having 2 stop surfaces. Low pressure centering port 148 can be configured to be in fluid communication with low pressure return line 170 (e.g., as shown in FIG. 1) such that when the spool 136 moves to either side, one of the high pressure ports 146, 150 begins to flow into the low pressure line 170 through the low pressure port 148, reducing the pressure and centering the spool 136.

With reference again to FIG. 1, a first solenoid valve 156 is operatively connected in fluid communication via a line 160 with a first actuation chamber 158 in the housing 138 for applying pressure to an end of the spool 136 to actuate the spool 136 (labeled in FIGS. 2-4). The first solenoid valve 156 is in fluid communication with the pressure supply 104 and the pressure return 106 for selectively pressurizing/depressurizing the first actuation chamber 158 of the transfer valve to bias the first end 168 of the spool 138 towards the third state shown in FIG. 4. A second solenoid valve 162 is also operatively connected to actuate the spool 136 (labeled in FIGS. 2-4) of the transfer valve 120 in an opposite direction from the first solenoid valve 156. The second solenoid valve 162 is in fluid communication with a second actuation chamber 164 (labeled in FIGS. 2-4) of the transfer valve via a line 166. The second solenoid valve 162 is connected in fluid communication with the pressure supply 104 and the pressure return 106 for selectively pressurizing/depressurizing the second actuation chamber 164 of the transfer valve to bias the land 144 of the spool 136 toward the second state shown in FIG. 3. The first state shown in FIG. 2 is obtained wherein both solenoids 156, 162 are not de-pressuring the spool 136 (those skilled in the art will readily appreciate that the system 100 can be reconfigured so that the solenoids instead depressurize the spool 136 in the normal state), which balances the spool 136 in the first state for the normal operation mode as shown in FIG. 2. In the normal state, both solenoids 156, 162 are in the off state, causing the cavities 158, 164 to be at the $P_{supply}$ pressure of the pressure supply 104. A shown in FIG. 1, the transfer valve 118 includes a return line 170 for returning fluid to the pressure return 106 as needed. The functionality of the first and second solenoids can also be archived with a three way EHSV where one EHSV control port is connected to each of the actuation chambers of the TV, which configuration may offer tradeoffs in weight, leakage, or plumbing complexity.

With further reference to FIG. 1, the controller 152 is operatively connected to control the first and second EHSVs 102, 112 for controlling the actuator 120 in the normal operation mode, i.e. with the transfer valve 118 in the first state shown in FIG. 2. The controller 152 is operatively connected to control the first and second solenoid valves 156, 162 drive the transfer valve 118 into the second state shown in FIG. 3 to disconnect the first EHSV 102 from the actuator 120 with the first EHSV 102 in a failed or non-operational mode. The controller 152 is configured to disable first EHSV 102 and continue operating the actuator at reduced power using only the second EHSV 112 in this state. The controller 152 is configured to disconnect the outlets 108, 110 of the failed EHSV 102 from the actuator 120 in the to avoid over-pressuring the second EHSV 112 and avoid uncontrollable actuators.

The controller 152 is operatively connected to control the first and second solenoid valves 156, 162 shift the transfer valve 118 to the third state shown in FIG. 4 to disconnect the second EHSV 112 from the actuator 120 with the second EHSV 112 in a failed or non-operational mode. The controller 152 is configured to disable the second EHSV 112 and continue operating actuator at reduced power using only the first EHSV 102 in this state. The controller 152 is configured to disconnect the outlets 114, 116 of the failed EHSV 110 as already described above with respect to the scenario where the first EHSV 102 fails.

The methods and systems of the present disclosure, as described above and shown in the drawings, provide for reducing actuator weight, envelope, and leakage for a component traditionally requiring dual electrohydraulic servo valves (EHSVs), a transfer valve, and a transfer EHSV. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:

a first electrohydraulic servo valve (EHSV) configured to be in fluid communication with a pressure supply and with a pressure return, the first EHSV including a first actuator extend line and a first actuator retract line and being operatively connected to pressurize one of the first actuator extend line or the first actuator retract line;

a second EHSV configured to be in fluid communication with the pressure supply and with the pressure return, the second EHSV including a second actuator extend line and a second actuator retract line and being operatively connected to pressurize one of the second actuator extend line or the second actuator retract line;

a transfer valve connected in fluid communication with the first EHSV via the first extend actuator line and via the first retract actuator line, wherein the transfer valve is connected in fluid communication with the second EHSV via the second extend actuator line and via the second retract actuator line; and an actuator with an extend chamber in fluid communication with both of the first and second extend actuator lines through the transfer valve, and a retract chamber in fluid communication with both of the first and second retract actuator lines through the transfer valve for extending an end effector when the first and second EHSVs pressurize the extend chamber, and for retracting the end effector when the first and second EHSVs pressurize the retract chamber, wherein the transfer valve has three states including:

a first state connecting both of the first EHSV and the second EHSV in fluid communication with the extend chamber and with the retract chamber for normal operation of the actuator with combined power from both the first EHSV and the second EHSV;

a second state disconnecting the first EHSV from the actuator but connecting the second EHSV in fluid communication with the actuator for a first backup mode in event of the first EHSV being non-operational; and a third state disconnecting the second EHSV from the actuator but connecting the first EHSV in fluid communication with the actuator for a second backup mode in event of the second EHSV being non-operational.

2. The system as recited in claim 1, wherein the transfer valve includes:

a valve extend chamber in fluid communication with both of the first and second extend actuator lines, and in fluid communication with a shared extend line that connects the valve extend chamber in fluid communication with the extend chamber of the actuator; and a valve retract chamber in fluid communication with both of the first and second retract actuator lines, and in fluid communication with a shared retract line that connects the valve retract chamber in fluid communication with the retract chamber of the actuator.

3. The system as recited in claim 2, wherein the transfer valve includes a spool separating the valve extend chamber and the valve retract chamber in fluid isolation from one another within a housing of the transfer valve, wherein the spool includes one or more lands configured to block the first actuator extend line and the first actuator retract line in the second state from fluid communication with the actuator, to block the second actuator extend line and the second actuator retract line in the third state from fluid communication with the actuator, and to unblock all of the first actuator extend line, the first actuator retract line, the second actuator extend line, and the second actuator retract line for fluid communication with the actuator in the first state.

4. The system as recited in claim 3, wherein the housing of the transfer valve includes a first high pressure centering port, a second high pressure centering port, and a low pressure centering port, wherein the spool includes a centering land configured to block the low pressure centering port in the first state, to block the second high pressure centering port in the second state, and to block the first high pressure centering port in the third state.

5. The system as recited in claim 4, further comprising a first solenoid valve operatively connected to actuate the spool of the transfer valve, wherein the first solenoid valve is in fluid communication with a first actuation chamber of the transfer valve, and with the pressure supply and the pressure return for selectively pressurizing/depressurizing the first actuation chamber of the transfer valve to bias the spool to the third state.

6. The system as recited in claim 5, further comprising a second solenoid valve operatively connected to actuate the spool of the transfer valve, wherein the second solenoid valve is in fluid communication with a second actuation chamber of the transfer valve, and with the pressure supply and the pressure return for selectively pressurizing/depressurizing the second actuation chamber of the transfer valve to bias the spool to the second state.

7. The system as recited in claim 6, further comprising a controller operatively connected to control the first and second EHSVs to control the actuator in the normal operation mode.

8. The system as recited in claim 7, wherein the controller operatively connected to control the first solenoid valve to disconnect the first EHSV from the actuator with the first EHSV in the non-operational mode.

9. The system as recited in claim 8, wherein the controller is operatively connected to control the second solenoid valve to disconnect the second EHSV from the actuator with the second EHSV in the non-operational mode.

10. The system as recited in claim 7, wherein the controller is configured to disable the first EHSV and continue operating the actuator at reduced power using only the second EHSV.

11. The system as recited in claim 10, wherein the controller is configured to disconnect the first EHSV from the actuator during failure of first EHSV.

12. The system as recited in claim 10, wherein the controller is configured to disable the second EHSV and continue operating the actuator at reduced power using only the first EHSV.

13. The system as recited in claim 12, wherein the controller is configured to disconnect the second EHSV from the actuator during failure of second EHSV.

14. A transfer valve comprising:

a housing including respective ports configured to be connected in fluid communication with a first EHSV via a first extend actuator line and via a first retract actuator line, wherein the transfer valve is configured to be connected in fluid communication with a second EHSV via a second extend actuator line and via a second retract actuator line; and a spool within the valve housing, wherein the spool has three states including:

a first state for connecting ports for both of the first EHSV and the second EHSV in fluid communication with a valve extend chamber of the housing and with a valve retract chamber of the housing;

a second state disconnecting ports for the first EHSV from the valve extend chamber and from the valve retract chamber but connecting ports for the second EHSV in fluid communication with the valve extend chamber and the valve retract chamber for a first backup mode; and a third state disconnecting ports for the second EHSV from the valve extend chamber and from the valve retract chamber but connecting ports for the first EHSV in fluid communication with the valve extend chamber and the valve retract chamber for a second backup mode in event of the second EHSV being non-operational.

15. The transfer valve as recited in claim 14, wherein the spool separates the valve extend chamber and the valve retract chamber in fluid isolation from one another within the housing.

16. A method comprising:

using two parallel electrohydraulic servo valves EHSVs with a single transfer valve to move an actuator during a normal operation mode; and upon failure of one of the EHSVs, using the single transfer valve to disconnect a non-operational one of the EHSVs and continuing to move the actuator with a functional one of the EHSVs in a backup mode.

17. The method as recited in claim 16, wherein the transfer valve includes:

a valve extend chamber in fluid communication with both of first and second extend actuator lines, and in fluid communication with a shared extend line that connects the valve extend chamber in fluid communication with an extend chamber of the actuator; and a valve retract chamber in fluid communication with both of first and second retract actuator lines, and in fluid communication with a shared retract line that connects the valve retract chamber in fluid communication with a retract chamber of the actuator.

18. The method as recited in claim 17, wherein the transfer valve includes a spool separating the valve extend chamber and the valve retract chamber in fluid isolation from one another within a housing of the transfer valve, wherein the spool includes one or more lands configured to block the first actuator extend line and the first actuator retract line in the second state from fluid communication with the actuator, to block the second actuator extend line and the second actuator retract line in the third state from fluid communication with the actuator, and to unblock all of the first actuator extend line, the first actuator retract line, the second actuator extend line, and the second actuator retract line for fluid communication with the actuator in the first state.

19. The method as recited in claim 18, wherein using the transfer valve includes controlling the transfer valve with a solenoid valve.

20. The method as recited in claim 16, further comprising disconnecting a failed one of the EHSVs from the actuator.

* * * * *